(12) United States Patent
English et al.

(10) Patent No.: US 6,944,774 B2
(45) Date of Patent: Sep. 13, 2005

(54) DATA FLOW CONTROL UNIT

(75) Inventors: Edward D. English, Scituate, MA (US); Dana B. Whitney, Mansfield, MA (US); Rolland Zeleny, Sharon, MA (US); William L. Burke, Needham, MA (US)

(73) Assignee: Zoom Telephonics, Inc., Boston, MA (US)

( * ) Notice: Subject to any disclaimer, the term of this patent is extended or adjusted under 35 U.S.C. 154(b) by 854 days.

(21) Appl. No.: 09/753,071

(22) Filed: Jan. 2, 2001

(65) Prior Publication Data

US 2001/0027526 A1 Oct. 4, 2001

Related U.S. Application Data

(63) Continuation-in-part of application No. 09/595,152, filed on Jun. 16, 2000.
(60) Provisional application No. 60/139,986, filed on Jun. 18, 1999.

(51) Int. Cl.[7] .............................. G06F 15/17; H04L 9/00
(52) U.S. Cl. ........................ 713/201; 379/445; 709/225
(58) Field of Search ................................ 713/201, 200; 709/225; 361/726; 379/445

(56) References Cited

U.S. PATENT DOCUMENTS

| | | | |
|---|---|---|---|
| 4,289,001 A | 9/1981 | Corfield ........................ 70/346 |
| 4,721,954 A | 1/1988 | Mauch .................. 340/825.31 |
| 4,760,393 A | 7/1988 | Mauch .................. 340/825.31 |
| 4,768,229 A | 8/1988 | Benjamin et al. ............. 380/20 |
| 5,194,855 A | 3/1993 | McCaslin et al. ...... 340/825.31 |
| 5,584,378 A | 12/1996 | Wecke et al. ............ 200/43.04 |
| 5,642,805 A | 7/1997 | Tefft ........................ 200/43.08 |
| 5,719,731 A | 2/1998 | Harmon ...................... 360/137 |
| 5,859,968 A | 1/1999 | Brown et al. ................ 395/186 |
| 5,868,014 A | 2/1999 | Lee ............................... 70/58 |
| 5,884,025 A * | 3/1999 | Baehr et al. ................. 713/201 |
| 5,894,551 A * | 4/1999 | Huggins et al. ............. 713/201 |
| 5,933,086 A | 8/1999 | Tischendorf et al. .. 340/825.31 |
| 5,938,767 A * | 8/1999 | Horn ........................... 713/200 |
| 5,959,540 A | 9/1999 | Walter .................... 340/825.31 |
| 5,963,420 A | 10/1999 | Bailey et al. ................ 361/616 |
| 6,212,558 B1 * | 4/2001 | Antur et al. ................. 709/221 |
| 6,212,635 B1 * | 4/2001 | Reardon ...................... 713/165 |
| 6,249,868 B1 * | 6/2001 | Sherman et al. ............. 713/168 |
| 6,308,204 B1 * | 10/2001 | Nathan et al. ............... 709/221 |
| 2002/0007459 A1 * | 1/2002 | Cassista et al. ............. 713/200 |
| 2002/0023232 A1 * | 2/2002 | Serani et al. ................ 713/202 |

* cited by examiner

Primary Examiner—Gregory Morse
Assistant Examiner—Matthew Heneghan
(74) Attorney, Agent, or Firm—Hamilton, Brook, Smith & Reynolds, P.C.

(57) ABSTRACT

An apparatus and method for regulating a flow of information based on a position of a key in a lock assembly is presented. Depending on a position of the key in the lock assembly and data flow rules, an electronic circuit regulates a flow of data to a target network. Data flow rules may be based on session type, transmit time, target address and password.

28 Claims, 5 Drawing Sheets

Fig. 3

| USER OR TERMINAL ID | SESSION TYPES ALLOWED | TRANSMIT TIME ALLOWED | TARGET ADDRESSES ALLOWED | PASSWORD |
|---|---|---|---|---|
| A | HTTP FTP | ANYTIME | UNLIMITED | PPK 486 |
| B | HTTP | non-work hours | specific address list | HGC 452 |
| C | none | never | none | N/A |
| D | HTTP FTP | 8-5 M-F | vendor/client websites | Doc 265 |
| E | FTP | unlimited | corporate sites | not required |

DATA FLOW CONTROL UNIT

RELATED APPLICATIONS

This application is a continuation-in-part of and claims priority to U.S. application Ser. No. 09/595,152 filed Jun. 16, 2000, which itself claims the benefit of prior U.S. Provisional Application Ser. No. 60/139,986 filed on Jun. 18, 1999, entitled "Access Control Lock," the entire teachings of both of which are incorporated herein by this reference.

BACKGROUND

Many computer-related applications incorporate some level of security to restrict user access. For example, in many applications, it is often necessary that a user of a computer provide a password to log on to a computer and corresponding network. The use of a password provided by a user affords at least some level of protection against intruders that would otherwise tamper with a computer and its contents.

Although the use of a password can be advantageously incorporated in many applications, there are sometimes drawbacks associated with their use. For instance, a user can forget a password if it is not used for an extended period of time. In some cases, a user can forget his or her password after returning from a long vacation.

To make matters worse, some systems require a user to change the password on a periodic basis for heightened security. This only adds to the difficulty of keeping track of a password at any given time. Even if a password is written on a piece of paper for later reference, the paper can be easily lost or destroyed, thwarting its purpose.

A password is also easily replicated to the extent that it can be transferred from one person to another by word of mouth. Thus, if a hacker breaks into a computer system and retrieves a user's password, this key is easily passed on to other vandals who can then tamper with a computer system and its contents. Moreover, a user that is assigned a password can misplace his or her trust in a friend who carelessly reveals a password to others even though it was intended to be kept secret.

These potential drawbacks are particularly disturbing since a corporation's most valuable asset is quite often information accessible by a user logging onto a password-protected computer.

SUMMARY OF THE INVENTION

The present invention is generally an apparatus and method for regulating data flow of information based on a position of a key in a lock assembly. More particularly, an illustrative embodiment of the present invention includes a mechanical lock that is activated by turning a key to an enabling or disabling position. Depending on a position of the key in the lock assembly, an electronic circuit enables a flow of data to a target network.

In certain applications, the data information transmitted to a target address is intercepted and decoded to identify whether the data information includes a request for data such as a web page available on a network. If so, the data information is further transmitted to the target address on the network based upon a position of the key in the lock assembly. More specifically, the data information including a request for data located on the network is transmitted to a target circuit if the key in the lock assembly is turned to an enabling position. Accordingly, access of information such as web page information through a communication link can be controlled by an administrator of a network having a key to the lock assembly by switching the key to an appropriate position.

A flow of data information can also depend on a provided password in conjunction with a position of the key in a corresponding lock assembly. For example, data information can be blocked if an appropriate password is not provided by a user attempting to transmit the data information. Alternatively, a flow of data information can depend on whether a user turning the key in the lock assembly provides a proper password for enabling or disabling data flows through a data or communication link.

A data base is optionally provided to store a set or multiple sets of data flow rules for determining which data information is allowed to flow through a communication link to a target address on a network. In conjunction with a position of the key in a lock assembly, the data flow rules dictate the conditions in which data is allowed to flow. For example, the key can potentially be set to one of multiple positions, enabling a corresponding mode of operation and set of data rules. Based on a selected mode, the corresponding set of data flow rules is used to determine which data information is allowed to pass to a corresponding target destination. Thus, different users can be allowed different levels of access to information on the network based on a position of the key in the lock assembly.

In a more specific application incorporating the principles of the present invention, the data information includes data packets such as TCP/IP (Transmission Control Protocol/Internet Protocol) packets and is decoded to determine whether the data information includes a URL (Uniform Resource Locator) indicating from which website data is to be retrieved or accessed. If the data information includes a request for access of information on a target network, the data information including the request is further transmitted to a target destination depending on a position of the key in the lock assembly and the data flow rules corresponding to the position of the key. In this way, it is possible to limit access of a user generating the data information from accessing information on a network. For example, in cases where the request for data information is blocked from a target destination, a corresponding user is unable to retrieve information from certain web sites as dictated by a selected set of data flow rules. In a similar manner, the data information can be decoded to determine the IP (Internet Protocol) address to which the data information is transmitted to selectively block the retrieval of certain information from a network.

In a similar application as previously described, the data information is generated by a user at a computer on a first network and the data information is transmitted to a target address on a second network. For example, the first network can be a local area network of multiple users or clients and the second network can be the Internet supporting access to a target address such as a network server on the Internet. Consequently, the position of the key in the lock assembly and data flow rules can be defined so that access to information on the target network is limited based on, for instance, which user is requesting access, the time of day or week, an allowed list of web sites, or type of communication session established by a particular user.

One way to sense the position of the key in the lock assembly is to couple the lock assembly to a switch and sense the state of the switch. Multiple switch positions, i.e., more than two, can be provided to support multiple access modes, where each position of the switch corresponds to a selected access mode and set of data flow rules that is to be used for regulating data flows. Different keys fitting the key-way of the lock assembly can be cut so that certain keys enable a key holder to set the switch to a limited number of positions, allowing a key-holder to select only certain access modes. Some keys can be cut so that a corresponding key-holder can turn the key in a corresponding lock assembly to select one of any of the possible access modes.

This aspect of the present invention is advantageous in applications where the communication link is coupled to a computer that is shared by multiple users. For example, each user can be issued a key enabling a corresponding user to select an appropriate access mode and retrieve information on a network.

In addition to limiting access to a network, the principles of the present invention can be used to block other types of data information. For example, an E-mail message directed to a target address on a network can be blocked from further transmission based upon a position of the key in the lock assembly. Thus, it is possible to restrict a user from transmitting potentially sensitive data such as secret corporate information to unauthorized recipients.

The present invention has many other advantageous features over the prior art. Specifically, a key-holder activating the lock assembly can control access of one or multiple users on a single computer or network of computers by switching the lock assembly to a desired switch position. Thus, data flows on, for example, a common traffic route can be regulated based upon an operational mode as selected by a position of a key in a lock assembly.

Many computer-related applications utilize a password such as a string of ASCII characters that are input through a keyboard to restrict user access. In such cases, an expert hacker can unfortunately break software codes to determine a password and, to the dismay of the system administrator, tamper with a computer and its contents. It is unlikely that such a software hacker is equally trained at the art of picking locks. Hence, the security system of the present invention is difficult to bypass for many vandals. Although a password provides some level of protection against intruders and is valuable in certain applications, once a password is revealed, it can be relayed to other users by word of mouth whereas a physical key can be replicated only by a skilled craftsman.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 3 is a table including data flow rules for regulating a flow of data information according to the principle of the present invention.

DETAILED DESCRIPTION OF THE INVENTION

A description of preferred embodiments of the invention follows.

Figure 1:
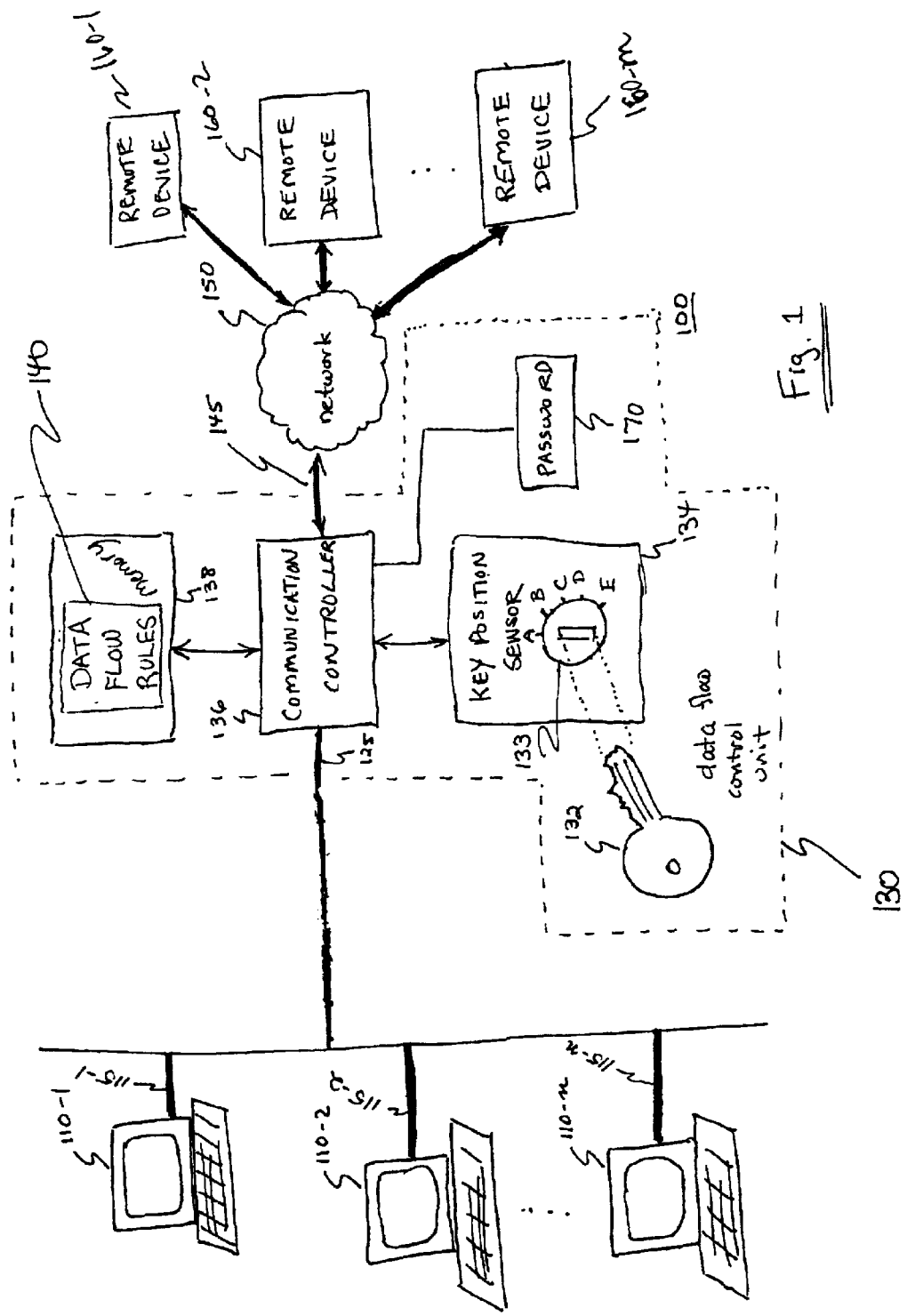
FIG. 1 is a block diagram illustrating the interconnectivity of various components for regulating data flows according to the principles of the present invention.

FIG. 1 is a block diagram of a communication system 100 incorporating a data flow control unit 130 for regulating a flow of data information through a data link according to the principles of the present invention. As shown, data flow control unit 130 is disposed to regulate a flow of data information between terminal equipment. For example, data information generated by a user at terminal device 110 is transmitted to a remote device 160. In a reverse direction, data information generated at remote device 160 is transmitted to any or all terminal devices 110-1, 110-2, . . . 110-n. Based on a position of key 132 in lock assembly 133, flows of data information are regulated. Thus, according to the principles of the present invention, a key-holder can control access of one or multiple users at corresponding terminal devices 110 by switching the key 132 in the lock assembly 133 to an enabling or disabling position.

In an application of the present invention where only a key 132 is necessary to select how data information is regulated as selected by a position of the key 132 in the lock assembly 133, an operator need not remember a password that can be easily forgotten or lost. For example, even if a password is written on a piece of paper, it is easily destroyed or copied. A physical key 132, preferably made of metal, for selecting an operational mode of data flow control unit 130 can be retained on a key ring and is much less likely than a password to be lost, copied or destroyed. Thus, there is a diminished likelihood that a key 132 will end up in the hands of an individual that will wrongly use system 100. Additionally, it is likely that a system administrator in possession of the key 132 carries a key chain for other personal items, so it is not necessarily inconvenient for him or her to also carry a key 132 for selecting an operational mode of data flow control unit 130.

Certain environments do not lend themselves to safely provide a keyboard and display for supporting the input of a password to select an operational mode of data flow control unit 130. For example, if the data flow control unit 130 is located in an environment susceptible to vandalism, a mere lock assembly 133 that supports selectivity of data flow modes is much less likely to be destroyed or tampered with than a keyboard and display that often spur more interest to a passer-by. A keyboard and display can also be very costly to support even if they are properly protected from vandals. Thus, whether a keyboard and display are additionally provided for selecting an operational mode of data flow control unit 130 depends on a particular application.

Many applications utilize a password such as a string of ASCII characters to restrict user access or mode selectivity. Although this level of security is advantageous in many situations, a drawback associated with a system based solely on a provided password is that an expert hacker can sometimes break software codes to determine the password and, to the dismay of the system administrator, tamper with a computer and its contents. It is unlikely that such a software hacker is equally trained at the art of picking locks. Hence, the security system of the present invention is more difficult to bypass. Although a password provides some level of protection against intruders, once a password is revealed, it can be relayed to other users by word of mouth whereas a physical key can be replicated only by a skilled craftsman.

In the exemplary embodiment as shown, data flow control unit 130 includes a communication controller 136 disposed between first link 125 and second link 145 to intercept the data flow of information between terminal devices 110 and remote devices 160. Communication controller 136 is coupled to memory 138 that stores a set of data flow rules 140 for regulating the flow of data information. Additionally, communication controller 136 is coupled to key position sensor 134 that detects a position of key 132 in lock assembly 133.

Figure 2:
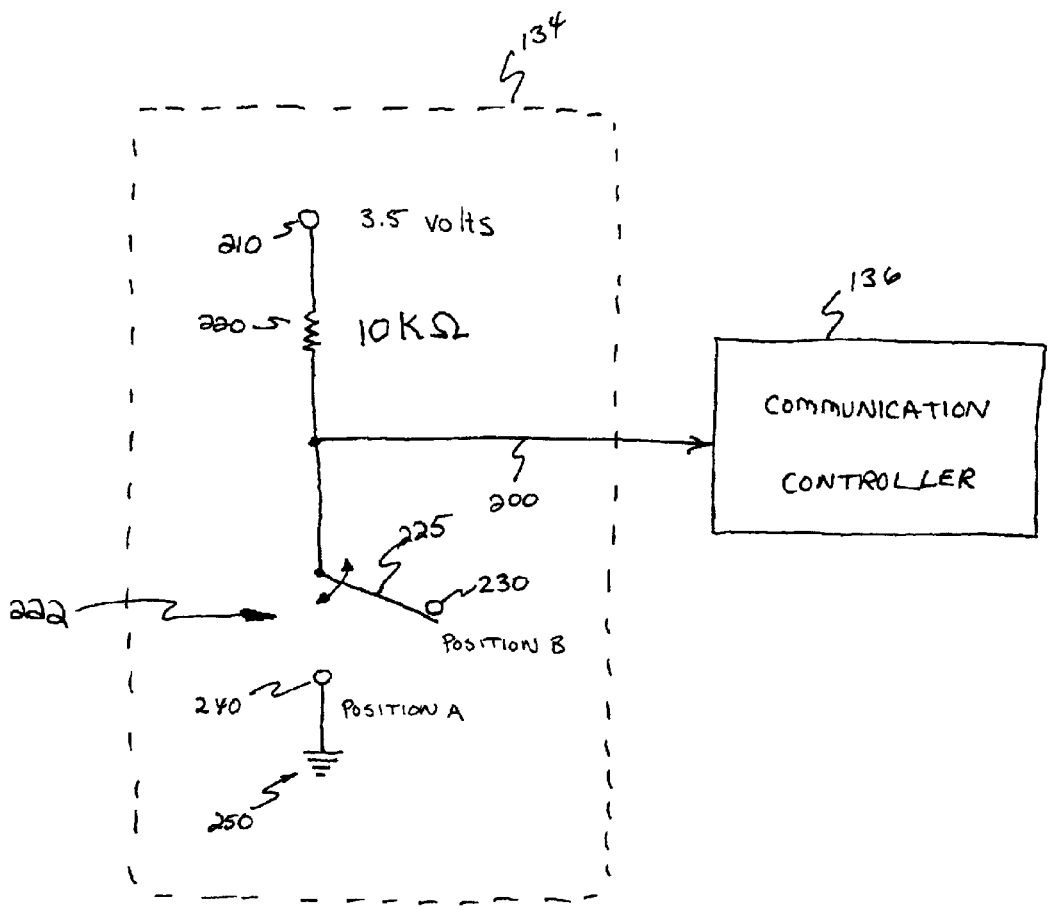
FIG. 2 is a diagram of an exemplary switch coupled to a lock assembly according to the principles of the present invention.

FIG. 2 is a diagram illustrating additional details of key position sensor 134. A voltage source 210 and pull-up resistor 220 produce position signal 200 that is fed to communication controller 136. The position signal 200 reflects the state of switch 222 coupled to lock assembly 133. Switch lever 225 is electrically conductive and is coupled to switch position signal 200. Based upon a position of the key 132 in lock assembly 133, switch lever 225 is generally set to either position A 240 or position B 230.

While switch lever 225 is in position A 240, position signal 200 is pulled down to ground 250. Conversely, while switch lever 225 is set to position B 230, switch position signal 200 is pulled up by voltage source 210. In this way, communication controller 136 senses the state of switch 222 and, therefore, the position of setting of key 132 in lock assembly 133 based upon a status of position signal 200. This key-controlled system can be very inexpensive to produce, especially compared to the cost of a keyboard and display that are often required in applications supporting password-controlled systems.

Although only a two-position switch 222 is shown in FIG. 2 as described above, key position sensor 134 can include a lock assembly 133 and switch 222 supporting multiple positions. For example, referring again to FIG. 1, key 132 can be used to select mode A, B, C, D or E as shown, where each switch position corresponds to a different access mode. Of course, this configuration requires slightly more complex circuitry than a two-position switch. This can be achieved using multiple pull-up resistors. Specifically, a pull-up resistor for each mode can be provided so that communication controller 136 can detect when key 132 is set to one of multiple positions. Accordingly, communication controller 136 can sense a key-selected mode of operation of data flow control unit 130.

In the two-position switch as described, communication controller 136 senses the setting of a two-position switch 222 supporting, for example, a locked and unlocked mode corresponding to position A 240 and position B 230, respectively. While in an unlocked position, data information through data flow control unit 130 is passed on to an intended target destination without restrictions. Conversely, while in a locked position data information is not necessarily allowed to flow to a target address. Of course, which mode is selected based upon a given switch position is arbitrary. For instance, data flows can be completely blocked while the key 132 is in the locked position and restricted in an unlocked position.

Referring again to FIG. 1 as previously discussed, another aspect of the present invention includes providing a set of data flow rules that dictate which data information shall be blocked or passed to a target address depending on a selected mode of operation. For example, consider a case where a user at terminal device 110-1 transmits data information such as TCP/IP data packets to a remote device 160 such as a network server on the Internet. The data information is transmitted through link 115-1 to first communication link 125 to communication controller 136 that intercepts the data information. Based on a position of the key 132 and data flow rules corresponding to a selected mode of operation, the intercepted data information is either blocked or further transmitted to second communication link 145 through network 150 such as the Internet to a remote device 160. Communication controller 136 can include a buffer such as a FIFO device (First In First Out) to temporarily store data information as it is being processed.

Although in the exemplary application data information is transmitted as TCP/IP data packets, information can be transmitted based on other communication protocols. It also should be noted that data information can be transmitted from remote device 160 to a terminal device 110.

In a similar manner as previously discussed, data information transmitted in the reverse direction is optionally intercepted by communication controller 136, where it is either blocked or further transmitted to a target terminal device 110-1, 110-2, . . . , 110-n. Depending on an application and corresponding data flow rules, data information transmitted through data flow control unit 130 can be regulated in either or both directions.

When data flows are regulated in a reverse direction, system 100 is similar to a firewall. Firewalls are security systems intended to protect an organization's network against external threats from vandals such as hackers. In many applications, firewalls prevent computers in one network system from communicating directly with computers in another network system and vice versa. Instead, communications are routed to a proxy that determines whether it is safe to pass the information through to the organization's network. According to the principles of the present invention, communication controller 136 functions similar in many respects to a proxy server that regulates data flows. However, in the present application, data flows are regulated depending on a position of a key 132 in a corresponding lock assembly 133. That is, different levels of firewall protection are achieved by selecting a corresponding operational mode using key 132.

In one application, data flow control unit regulates data flows based on a position of the key 132 in lock assembly 133 and a provided password 170. For example, to select a particular mode of operation, in addition to selecting a switch position by turning the key 132 in lock assembly 133, an operator can provide a password 170. Although not shown, a user can type in such a password 170 on a keyboard coupled to a display device. This provided password 170 can then be compared to a list stored in communication controller 136. Accordingly, confirmation of password 170 as input by an operator provides an additional level of security to insure that the operator selecting the operational mode of data flow control unit 130 via key 132 has the authority to do so. This added level of security insures that the operator has the authority to regulate data flows, which can be vitally important to the security of, for example, corporate information.

As previously mentioned, terminal devices 110 can be part of a LAN (Local Area Network). For example, each terminal device 110 can be connected to communication controller 136 through communication links 125 and 115. The links 115 and 125 connecting terminal devices 110 to communication controller 136 are preferably an Ethernet-type link based on the IEEE 802.3 standard. Alternative link-types such as those based on SNA (Systems Network Architecture), ARC net IEEE 802.5 (Token Ring), FDDI (Fiber Distributed Data Interface), Local Talk, ARCnet (Attached Computer Resources network), HPNA (Home Phone Networking Alliance), HomeRF (Home Radio Frequency), Home Plug (Home Plug Powerline Alliance), Bluetooth, or any other standard can be used to communicate information according to the principals of the present information.

Another standard for providing connectivity between terminal devices 110 and communication controller 136 is IEEE 802.11, which is a standard for WLANs (Wireless Local Area Networks). In short, the 802.11 standard describes a protocol for transmitting data among multiple transceivers (not shown) over a wireless link.

The 802.x standards generally provide access to channels based on an access method known as Carrier Sense Multiple Access with Collision Avoidance (CSMA/CA). In simple terms, this method is based on a "listen before talk" scheme. For example, a transceiver located in each terminal device 110 and communication controller 136 monitors traffic on a radio channel to determine if another transceiver is transmitting. If the radio channel is clear, the terminal device 110 can transmit information over the radio channel. Based on this CSMA/CA scheme, transmission of data from the same transmitter cannot occur before a minimum time gap. After the minimum time gap has passed, the station selects a random "backoff interval" which is the wait time before the radio channel is again monitored to determine whether the radio channel is clear to transmit. If the channel is still busy, a shorter backoff interval is selected. This process is repeated until the transmitter is allowed to transmit data.

Network messages or data information transmitted by a transceiver device over a wireless link typically include an extra protocol layer so that packets can be transmitted over the radio channel and, thereafter, be processed by a transceiver device at communication controller 136 upon receipt. Once received, the extra protocol layer is stripped off to retrieve the original network messages for further processing as previously discussed. In a reverse direction, network messages emanating from communication controller 136 destined for one of the terminal devices 110 are reformatted before transmission over the exemplary wireless communication link 100. As in the former mentioned implementation of data flows from a terminal device 110 to communication controller 136, an extra layer added by a transceiver at communication controller 136 in the reverse direction is likewise stripped off by receiving terminal devices 110. In short, the extra wireless protocol layer is used to reformat network messages, facilitating the transmission of such data over a wireless communication link.

Further details of the aforementioned standard of transmitting data information can be found in IEEE 802.11, which is available from IEEE located in Princeton, New Jersey. Likewise, the IEEE 802.3 standard related to Ethernet communication is also available from the IEEE.

It should be noted that the use of IEEE 802.11 compliant equipment is merely exemplary. Other wireless or hardwired systems can be used to support communication among a plurality of terminal devices 110 and communication controller 136.

FIG. 3 is a table of an illustrative set of data flow rules according to the principles of the present invention. As previously mentioned, each operational mode of data flow control unit 130 utilizes a different set of data flow rules. For example, the position of key 132 in lock assembly 133 dictates an operational mode of data flow control unit 130 and which set of data flow rules 140 are selected for regulating data flows.

In one application, the data flow control unit 130 regulates data information based upon contents of the data information. More specifically, flows can be regulated depending on a content of a data packet and embedded information indicating a user or terminal device 110 transmitting the data information. One way to determine a source of data information is to include such information in the data information and detect it at the data flow control unit 130 as it is intercepted. For example, a TCP/IP data packet includes a source address indicating from which terminal device 110 a data packet of information is transmitted. Once it is known from which device the data information is transmitted as a result of processing corresponding data, the data information can be disposed of accordingly. That is, the data information can be transmitted to a target destination according to corresponding data flow rules 140. The data information can also be blocked from a target destination.

As mentioned, data flow rules 140 can dictate different conditions under which a particular user or terminal device 110 is allowed to transmit and receive data information through data flow control unit 130. One aspect of regulating data flows is based on a session type selected for communicating data information to a target device such as remote device 160. For example, certain users can be restricted to certain data transfer types such as HTTP (Hypertext Transfer Protocol) or FTP (File Transfer Protocol). Thus, data flow control unit 130 can be used to allow users to transmit and receive data information based on allowed session-types.

Data flows can also be regulated based on the time of day. For example, selected users can transmit and receive data only during certain work hours according to data flow rules 140, while others can transmit and receive information through data flow control unit 130 at any time. Thus, according to the principles of the present invention, it is possible to restrict an employee from accessing information on the Internet during a particular time of day. This aspect of the present invention is particularly useful in situations where an employer desires to restrict employee access of information on the Internet so that such a privilege is not abused.

A list of accessible target addresses can also be provided in data flow rules 140, indicating from which addresses information can be retrieved. This is sometimes referred to as a "white" list.

In the alternative, a list of inaccessible target addresses can be provided indicating addresses from which information can not be retrieved. This is sometimes referred to as a "black" list. Some situations require an inaccessible target list in data flow rules 140 because the accessible target list might otherwise be too large.

According to such data flow rules 140, certain users otherwise can be allowed different levels of access to target addresses such as web sites on the Internet. Such lists can change on daily basis. For example, if it is learned by a network administrator that an employee visits a web site not related to work, such a site address can be added to the black list.

One method of regulating information directed to a target address as previously discussed involves intercepting the data information packets as they are received at communication controller 136. The packets are then decoded to determine a URL address to which the data packet is directed. This is achieved by comparing the text string of the URL address with the allowed or disallowed site list for a user or group of users. If the data information includes a request for access of information that is allowed based on data flow rules 140 as selected by a key 132 in lock assembly 133, the data information including the request is further transmitted to a target destination. Consequently, it is possible to limit access of a user generating the data information from accessing web site information on a network 150 such as the Internet.

Data flow control unit 130 and, more specifically, communication controller 136 can also decode data information packets to determine an encoded binary address to which data information is directed. For example, the data information can include an IP (Internet Protocol) destination address to which the information is directed. In a similar manner as described above, the communication controller 136 compares the IP address of data information packets to the allowed target list in data flow rules 140 to determine whether to further transmit the message or data information to an intended target destination.

A list of allowed or disallowed target destination addresses is preferably listed for each user or terminal. However, user or terminal types can be classified into groups so that data flows from a corresponding group of users or terminals is regulated according to a group-type instead of individual user or terminal-type. To support this feature, the generated data information can include information indicating from which group data information is being transmitted. Alternatively, a separate message can be sent to the data flow control unit 130 indicating from which group-type data information is generated.

Also according to the principles of the present invention, certain transmissions such as E-mail messages can be regulated so that they are not delivered to a target address. In a reverse manner, E-mail messages can be blocked from a particular user based on an address of the party generating the E-mail. This feature of the present invention is particularly beneficial to employers that desire to restrict employees who abuse the privilege of using, for example, the Internet for communicating personal E-mail messages during work hours.

Data flows can also be regulated based on a password provided by a user or terminal generating the data information to be transmitted to a target address. As shown in FIG. 3, different users can be assigned different passwords. If the wrong password is provided by a party attempting to transmit the data information, data information from the user or terminal device 110 is potentially blocked from further transmission to a target address depending on data flow rules 140.

Figure 4:
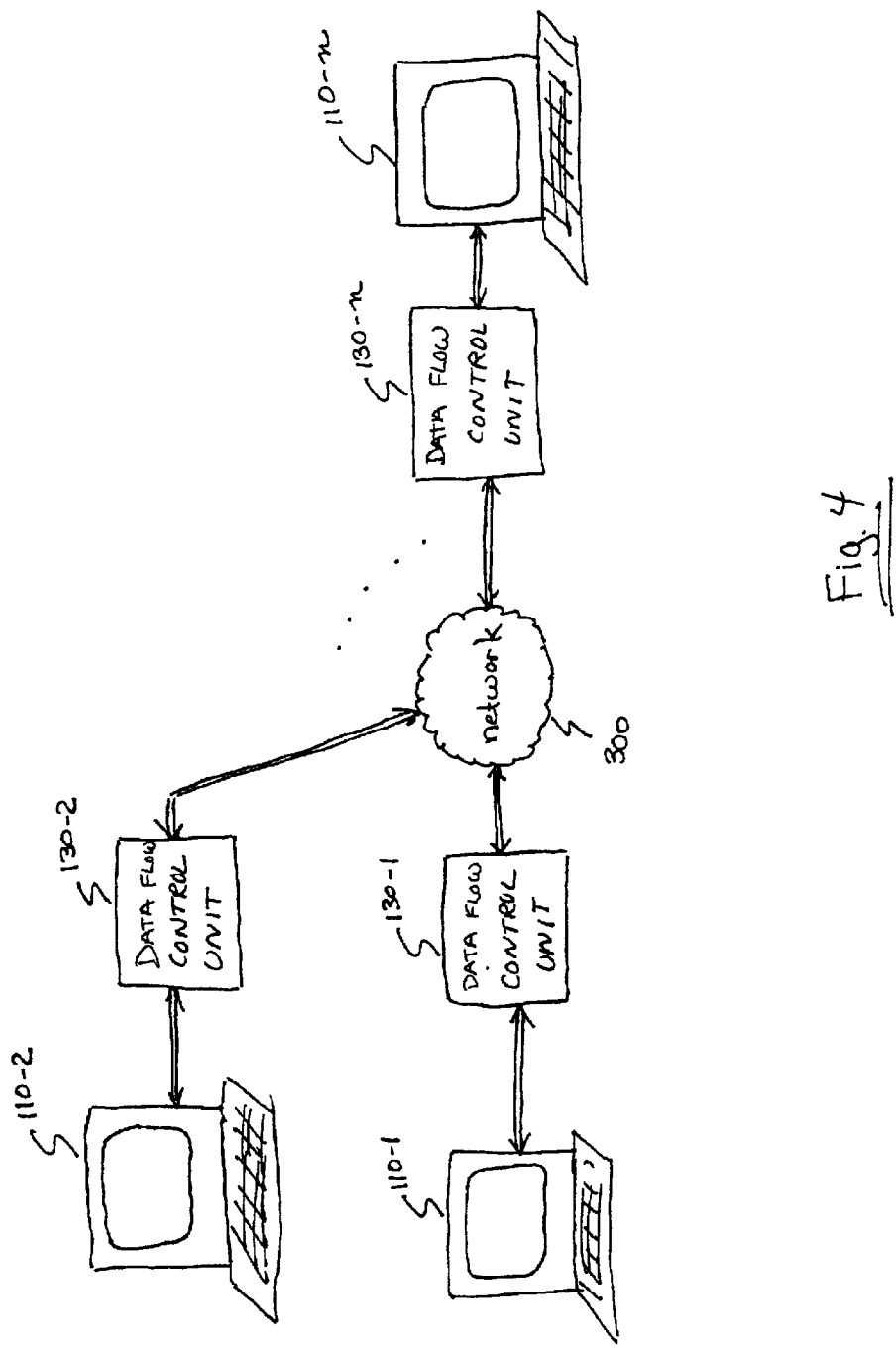
FIG. 4 is a block diagram illustrating the interconnectivity of various components for regulating data flows from a single computer according to the principles of the present invention.

FIG. 4 is a diagram illustrating another application exploiting features of data flow control unit 130 according to the principles of the present invention. As shown, each data flow control unit 130 is coupled directly to a single terminal device 110. In such an application, a user having possession of a key 132 can access or communicate with other terminal devices 110 on network 300 based upon a position of key 132 in lock assembly 133 of the corresponding data flow control unit such as 130-1.

Different keys 132 can be cut so that different users at a particular terminal 110 have limited access to a network based on a corresponding type of key 132 in their possession. That is, each key 132 can be cut so that only certain data flows modes are selectable by a particular key-holder. For example, one key 132 can be cut so that only mode A or B can be selected by a key-holder. A second key can be cut so that mode A, B, or C can be selected, and so on. In this way, access to information on a network can be restricted at terminal device 110 based on a key-type that is used to select a specific data flow mode. As previously discussed, data flow can be restricted in either direction. This aspect of the present invention is particularly useful in situations where a terminal device 110 is used by multiple users, each requiring a different level of access to a network 300 such as a LAN (Local Area Network) or WAN (Wide Area Network).

Figure 5:
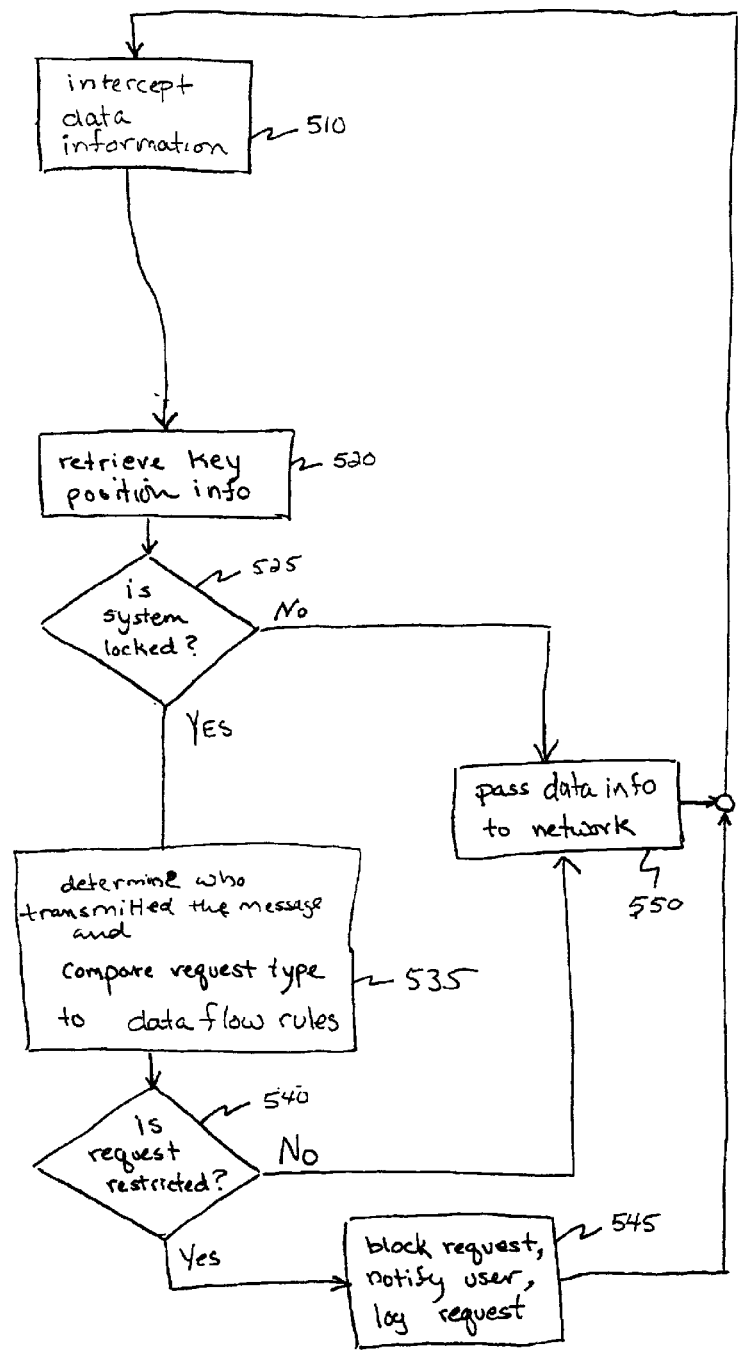
FIG. 5 is a flow chart indicating an exemplary process for regulating data flows according to the principles of the present invention.

FIG. 5 is a flow chart illustrating how a data flow can be regulated according to the principles of the present invention.

Data information transmitted to communication controller 136 is intercepted in step 510. Based on a content of the data information, it is determined whether the intercepted data information shall be further transmitted to a target address. This involves retrieving key position information to determine a selected operational mode of the data flow control unit 130 in step 520.

If lock assembly 133 is in an unlocked position in step 525, the data information is transmitted to a target address on the network in step 550. Alternatively, if the lock assembly 133 is in a locked position as determined in step 525, the data information is decoded and compared to selected data flow rules 140 in step 535.

If the user requesting access is not restricted according to a selected set of data flow rules 140 as determined by a position of the key 132 in lock assembly 133 in step 540, the data information is transmitted to the corresponding target device in step 550. If the user is restricted based on a selected set of data flow rules 140 in step 540, the data information is blocked from further transmissions to the target destination in step 545 and the user is notified accordingly. Events corresponding to blocked data transmissions or data re-transmission are optionally logged so that a system administrator can review them at a later time. It is thus possible to determine if an employee is attempting to use the system in a way that is not authorized.

While this invention has been particularly shown and described with references to preferred embodiments thereof, it will be understood by those skilled in the art that various changes in form and details may be made therein without departing from the scope of the invention encompassed by the appended claims.

What is claimed is:

1. An apparatus for regulating data flow to a network comprising:
    a mechanical lock assembly having multiple activated positions that is activated by turning a key; and
    an electronic circuit that senses a position of the key in the lock assembly to regulate a flow of data information to a target network based on data flow rules selected by the position of the key.

2. An apparatus as in claim 1, wherein the data information is intercepted and decoded by the electronic circuit to identify requests for data available on the network, and the data information including a request for data is transmitted to a target network when the key is in an enabling position of the lock assembly.

3. An apparatus as in claim 1, wherein the data information includes network data packets transmitted to a wide area network from which information is accessed.

4. An apparatus as in claim 1, wherein the network is the Internet.

5. An apparatus as in claim 1, wherein the electronic circuit has access to a database of data flow rules for determining which data information is allowed to flow to the network.

6. An apparatus as in claim 5, wherein the electronic circuit decodes the data information to determine a URL (Uniform Resource Locator) indicating a target address on the network from which information is to be accessed, the electronic circuit enabling further transmission of the data information to the target address based on data flow rules and a position of the key in the lock assembly.

7. An apparatus as in claim 5, wherein the electronic circuit decodes the data information to determine an IP (Internet Protocol) target address indicating to which network address a data packet is directed, the electronic circuit enabling further transmission of the data information to the target address based on data flow rules and a position of the key in the lock assembly.

8. An apparatus as in claim 1, wherein the data information is generated by a user at a computer on a first network and the data information is transmitted to a target address on a second network.

9. An apparatus as in claim 8, wherein the target address on the second network is a server.

10. An apparatus as in claim 1, wherein the data information includes a request for web page information.

11. An apparatus as in claim 1, wherein the electronic circuit enables a flow of data information to a target network based upon a provided password.

12. An apparatus as in claim 11, wherein the password is provided by a user attempting to access information from a target address.

13. An apparatus as in claim 11, wherein the password is provided by a person activating the lock assembly by turning the key.

14. A device for regulating data information transmitted through a communication link, the device comprising:

a sensing unit that detects a position of a switch coupled to a lock assembly, the switch being activated by turning a key to a position in the lock assembly;

a memory device for storing data flow rules of the communication link; and a communication controller that intercepts the data information transmitted through the communication link and, based on the data flow rules as selected by a position of the switch and a provided password, regulates a further flow of the data information through the communication link, wherein the communication link supports data information flows of multiple session types and the data flow rules indicate which session types shall be supported by the communication link, the communication controller further transmitting intercepted data information associated with allowed session types based on a position of the key in the lock assembly in conjunction with the provided password.

15. A method of limiting access to a network, the method comprising:

sensing a position of a switch having multiple activated positions coupled to a lock assembly activated by turning a key; and regulating a flow of data information to the network through a communication link based on data flow rules selected by the position of the switch.

16. A method as in claim 15, wherein the step of enabling flow of data information includes:

intercepting the data information;

decoding the data information to identify requests for information available on the network; and based on a position of the switch, transmitting the data information including requests to a corresponding target address or blocking the data information from a target address.

17. A method as in claim 15, wherein the data information includes network data packets transmitted to a wide area network from which information is accessed.

18. A method as in claim 15, wherein the network is the Internet.

19. A method as in claim 15, further comprising the step of:

accessing a database of data flow rules for determining which data information is allowed to flow to the network.

20. A method as in claim 19 further comprising the steps of:

decoding the data information to determine a URL (Uniform Resource Locator) indicating a target address on the network from which information is to be accessed; and enabling further transmission of the data information to the target address based on data flow rules and a position of the key in the lock assembly.

21. A method as in claim 19, further comprising the steps of:

decoding the data information to determine an IP (Internet Protocol) target address indicating to which network address a data packet is directed; and enabling further transmission of the data information to the target address based on data flow rules as selected by a position of the key in the lock assembly.

22. A method as in claim 15, wherein the data information is generated by a user at a computer on a first network and the data information is transmitted to a target address on a second network.

23. A method as in claim 22, wherein the target address on the second network is a server.

24. A method as in claim 15, wherein the data information includes a request for web page information.

25. A method as in claim 15, further comprising the step of:

enabling a flow of data information to a target network based upon a provided password.

26. A method as in claim 25, wherein the password is provided by a user attempting to transmit corresponding data information.

27. A method as in claim 25, wherein the password is provided by a person activating the lock assembly by turning the key.

28. A method of limiting access to a network, the method comprising:

means for sensing a position of a switch having multiple activated positions coupled to a lock assembly activated by turning a key; and means for regulating a flow of data information to the network through a communication link based on data flow rules selected by the position of the switch.

* * * * *